United States Patent
Bishop

(10) Patent No.: US 6,968,810 B2
(45) Date of Patent: Nov. 29, 2005

(54) PET RAMP

(76) Inventor: Lawrence Bishop, P.O. Box 2764, Pinellas Park, FL (US) 33780

( * ) Notice: Subject to any disclaimer, the term of this patent is extended or adjusted under 35 U.S.C. 154(b) by 0 days.

(21) Appl. No.: 10/725,172

(22) Filed: Dec. 1, 2003

(65) Prior Publication Data

US 2005/0115522 A1  Jun. 2, 2005

(51) Int. Cl.$^7$ ............................................. A01K 29/00
(52) U.S. Cl. ...................................................... 119/847
(58) Field of Search ............................... 119/847–849

(56) References Cited

U.S. PATENT DOCUMENTS

| | | | |
|---|---|---|---|
| 3,173,398 A * | 3/1965 | Raymond | 119/28.5 |
| 3,961,385 A * | 6/1976 | Ferry | 5/504.1 |
| 4,541,137 A * | 9/1985 | Murray | 5/498 |
| 5,002,012 A * | 3/1991 | Pierrot | 119/28.5 |
| 5,161,484 A * | 11/1992 | Duane | 119/28.5 |
| 5,213,060 A * | 5/1993 | Sloan et al. | 119/847 |
| 5,257,426 A * | 11/1993 | Leoutsakos | 5/503.1 |
| D375,388 S * | 11/1996 | Tsugita | D30/118 |
| 5,924,383 A * | 7/1999 | Smith | 119/165 |
| 6,119,634 A * | 9/2000 | Myrick | 119/847 |
| 6,267,082 B1 * | 7/2001 | Naragon et al. | 119/849 |
| 6,536,372 B1 * | 3/2003 | Loeser | 119/28.5 |
| 6,588,366 B1 * | 7/2003 | Ranson et al. | 119/28.5 |

\* cited by examiner

*Primary Examiner*—Thomas Price
(74) *Attorney, Agent, or Firm*—Charles E. Lykes, Jr.

(57) ABSTRACT

The invention describes and adjustable ramp which allows a pet to move on and off a bed with minimal disruption to the appearance or function of the bed. It comprises a ramp and a platform which are adapted for adjustable height. It may be supported by both the mattress and box spring of the bed and adjustable legs. It may be further adapted to avoid interference with a bedspread or cpmforter.

14 Claims, 7 Drawing Sheets

PET RAMP

FIELD OF THE INVENTION

The invention relates to pet accessories, particularly those which are concerned with comfort and handling of pets. In particular, the invention relates to ramps and devices useful in providing for allowing access of pets to areas of the house or furniture.

BACKGROUND OF THE INVENTION

Many pet owners permit, or even desire, that their pet have access to a standard adult bed. Smaller or older dogs often cannot access a bed without assistance. Additionally, it may be dangerous for a smaller dog to jump off a bed. This could even pose a risk for larger or younger dogs. Consequently it is helpful to have some means or method to permit a dog to safely and easily be able to climb on and off of a standard adult bed in the absence of human supervision.

Previous inventions have addressed this problem by providing various forms of ramps or other devices for this purpose. For instance U.S. Pat. No. 5,634,440, issued to Mogck on Jun. 3, 1997, teaches a step assembly which can be converted to a ramp. The apparatus requires the use of side frame members and is not easily stored. The device is suitable for only a narrow range of heights.

U.S. Pat. No. 5,214,060, issued to Sloan on May 25, 1993, is a more simple apparatus, a ramp is supported from a support plate which may be passed between the mattress and box spring or between the mattress and whatever surface may be supporting it. The ramp can be close enough to the bed to permit a pet to climb upon or down from a bed by using the ramp.

While it is clear the Sloan device, U.S. Pat. No. 5,213,060, is simpler to use, it still is somewhat limited by the location of the pivot or swivel between the ramp and the support member. This is a limitation with respect to the height of bed which can be served by it. Additionally, the support member passes directly out from beneath the mattress to the ramp and interferes with or prohibits the use of a bedspread or comforter in a manner allowing an attractive display or normal hanging of the material along the side of the bed.

The prior art, unfortunately, has several drawbacks and shortcomings. For instance, some of these devices require an elaborate support structure. Once assembled it is both troublesome and time consuming to dissemble them for storage or just to put out of the way for a short time.

Other such devices are adapted to be supported by the bed itself. As many beds are adapted with a mattress and box spring, support can be achieved by sliding a support slat between the mattress and box spring and pivotally attaching a ramp for the pet, such as in Sloan, '060.

There is a problem with this, however. Many people are desirous of leaving a bed covered with a mattress or comforter which covers the surface of the bed and hangs over the edges towards the floor. When using the box spring or mattress supported ramp, it is clear that the side of the bed will be substantially blocked through the width of the support. This, at best, is unattractive and may also result in harm to the bedspread or comforter.

Accordingly, it would be helpful to provide a pet ramp which avoids the drawbacks of the prior art by allowing access to bed surfaces for a variety of bed and pet sizes and also allows quick and easy assembly and disassembly.

SUMMARY OF THE INVENTION

The inventor has overcome the drawback of the prior art by providing a pet ramp which does not require an elaborate support structure and which also may be adapted so as to not interfere with the use of a bedspread or comforter. The present invention is also fast and easy to install or remove.

This problem has been overcome by providing a brace for supporting a ramp which may be attached near the top of the ramp and secured between the mattress and box spring. The ramp may be further adapted with a deep unshaped portion in order to permit the bedspread or comforter to hang within. In this manner the ramp may be adequately supported and the bedspread or comforter may remain in place. The apparatus may be made and practical with or without a platform.

For larger dogs, or in other special circumstances, the ramp may be further buttressed or secured for safety to the frame of the bed. Additionally, other safety and comfort features may be applied, such as non slip surfacing or padding to the ramp.

It is, then, an object of the present invention to provide a pet ramp which does not require an elaborate or unattractive support structure.

It is further object of the present invention to provide such a pet ramp which may be used without interfering with the use of a bedspread or comforter.

It is a further object of the present invention to provide such a pet ramp which may be easily enhanced for increased safety or security.

It is a further object of the present invention to provide such a pet ramp which may be adapted for the comfort and safety of a pet.

It is a further object of the present invention to provide such a ramp which may be secured to accommodate larger pets.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

Figure 1:
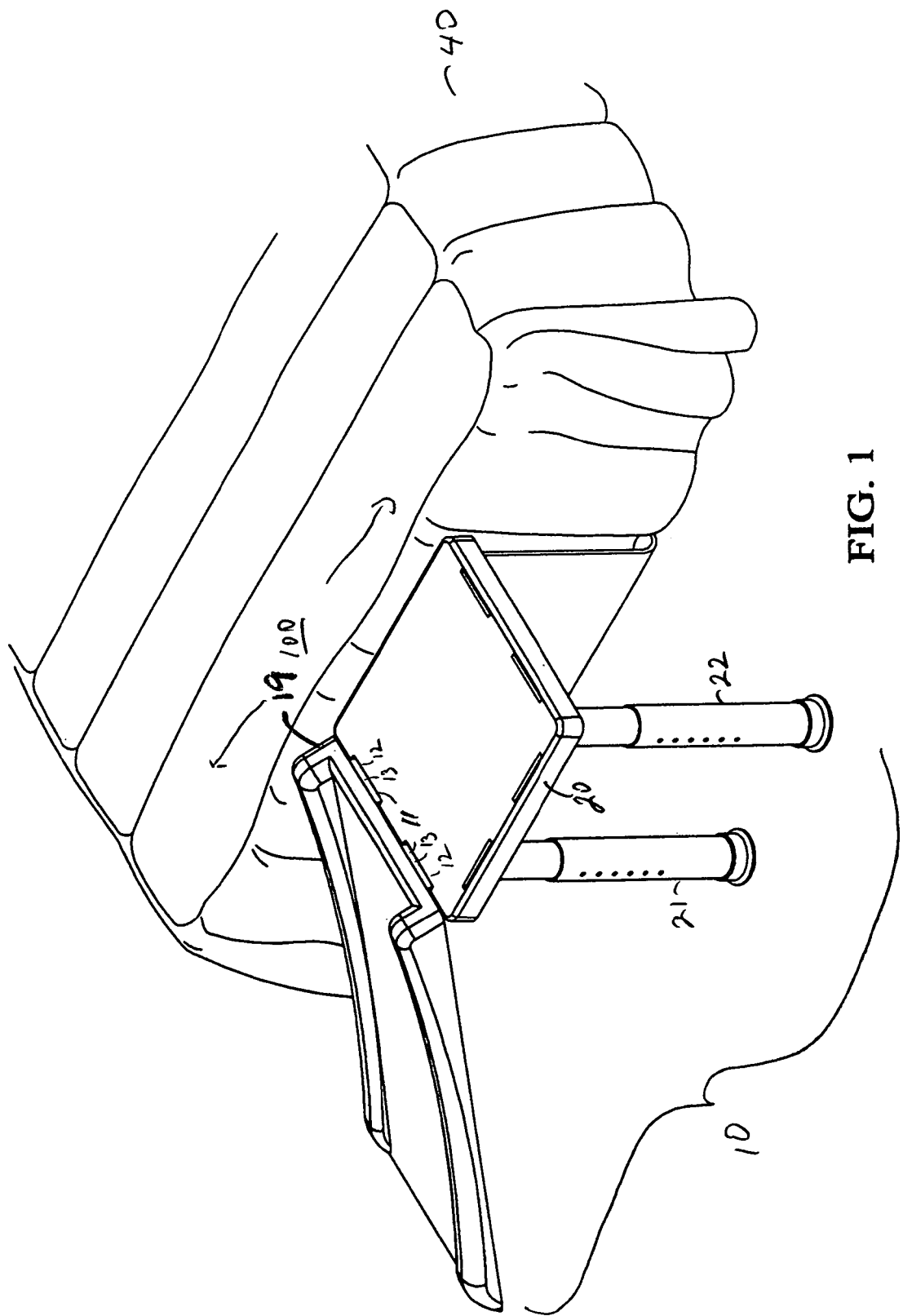
FIG. 1 depicts the platform version of the pet ramp oriented with the ramp parallel to a bed and further depicts the bedspread.

While certain drawings have been provided in order to teach the principles and operation of the present invention, it should be understood that, in the detailed description which follows, reference may be made to components or apparatus which are not included in the drawings. Such components and apparatus should be considered as part of the description, even if not included in such a drawing. Likewise, the drawings may include an element, structure, or mechanism which is not described in the textual description of the invention which follows. The invention and description should also be understood to include such a mechanism, component, or element which is depicted in the drawing but not specifically described.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

While the following description will seek to improve understanding of the invention by describing the various components and elements, it should be considered that certain apparatus may be sufficiently and adequately explained by the accompanying drawings, which are fully incorporated herein, and not require further description. All such apparatus should be considered as part of the specification of the invention for all purposes.

Making reference first to FIG. 1 the basic apparatus is depicted as installed and without enhancements. A pet ramp (10) is connected to platform member (20) by means of a hinge (11). The hinge (11) may be created by having one or more slots (12) available to receive one or more protrusions (13) from the ramp (10). The platform member (20) may supported by two legs (21,22) and also supported by a flat portion (33) (FIG. 2, but not depicted in FIG. 1) which slides between the box spring (30) and mattress (31) of a standard bed. (40). This flat supporting portion (33) may be in communication with the platform (20) by means of a U-channel (40), which will be described in greater detail later. In FIG. 1 the apparatus is oriented so that the ramp member (10) runs parallel to the bed (100) whereas in FIG. 2 the ramp (10) is attached to run perpendicular to the bed (100).

Figure 2:
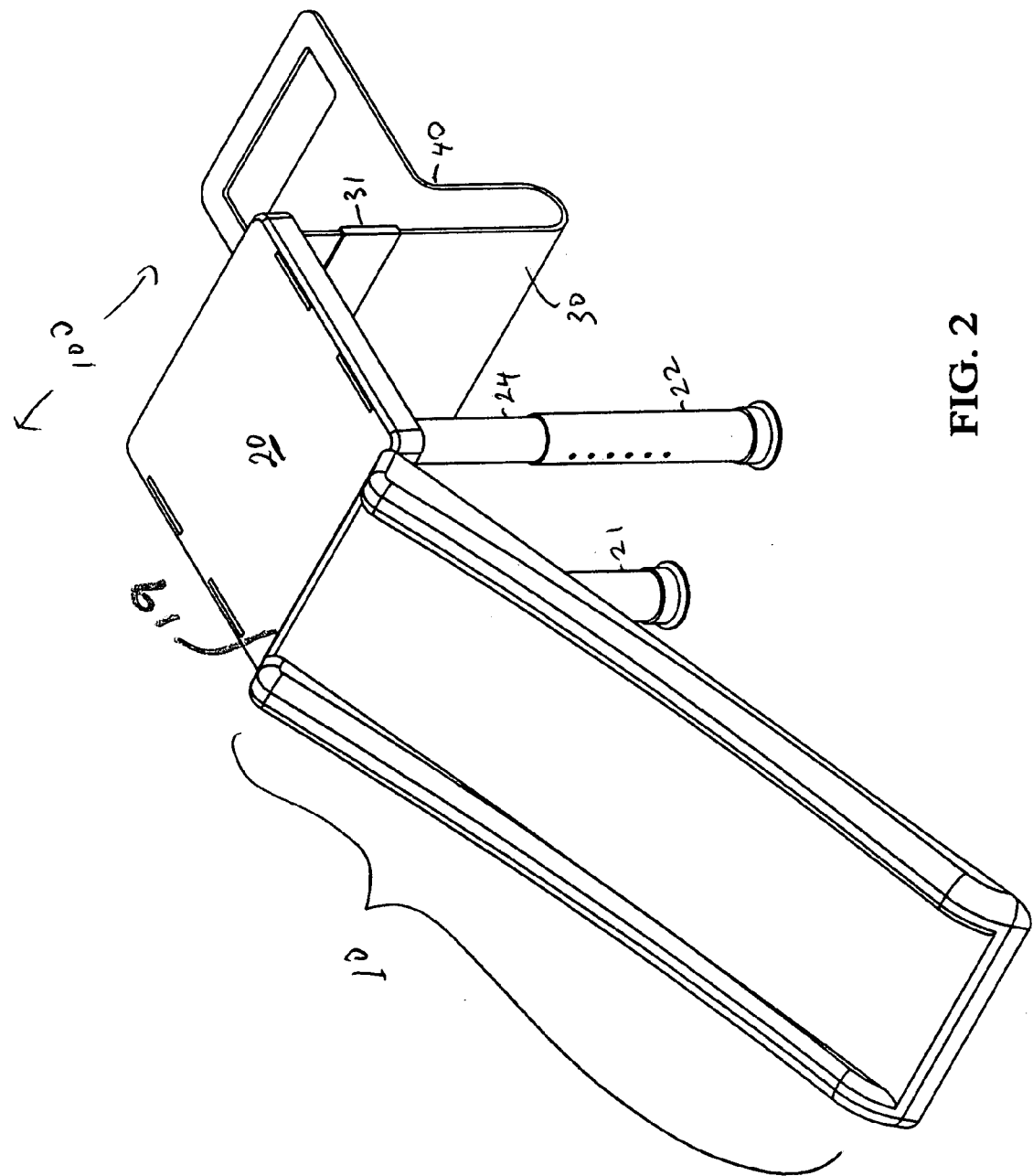
FIG. 2 depicts the platform version of the that ramp in isolation oriented with the ramp to be perpendicular to a bed.

FIG. 2 depicts the ramp (10) apparatus running perpendicular to the bed (100) so that the other component parts can be more readily seen. In particular, it should be noted that the platform support member (30) may be adapted to permit the ramp to be used with beds of varying heights or to achieve various angles of climbing for the comfort and safety of the pet. This is done by the use of one or more telescoping sections (24) for the legs (21, 22) to the platform coupled with a leaf member (31) for the Uchannel (40) connection to the platform (20). Such also may result in different angles of ascent and descent up and down the ramp (10).

Figure 3:
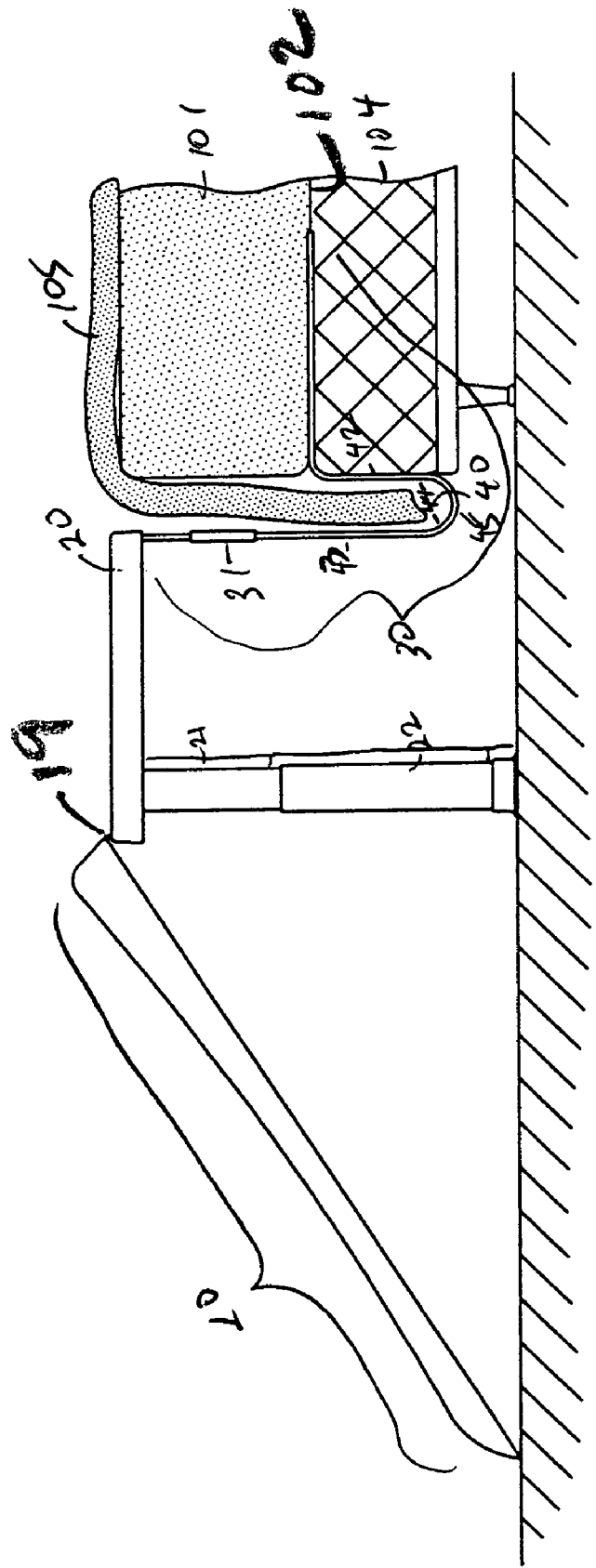
FIG. 3 depicts a side view of the pet ramp apparatus as installed on a bed.

Making reference now to FIG. 3, which is a side view of the perpendicular ramp (10) version. It can be seen that the level of the platform (20) may be adjusted by use of the telescoping legs (21, 22) (which are more fully depicted in FIG. 7). It is also seen that the U-shaped channel is subject to adjustment for the purpose of either conforming to the height of the platform or to the desired size of the comforter or bedspread as it may hang down from the surface of the bed by the leaf (31). This adjustment apparatus is more fully set forth in FIGS. 4 through 6.

Figure 4:
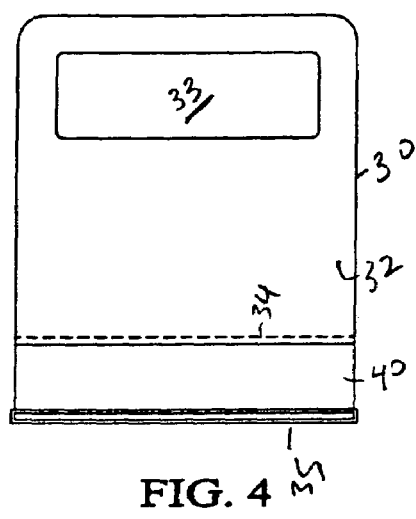
FIG. 4 depicts the U-shaped support member from above, particularly depicting the member which is inserted beneath the mattress.

FIG. 4 depicts the support member (30) with U-shaped channel (40) from the top. Such comprises a supporting region (32) and a U-shaped channel region (40). In FIG. 4 it is shown that the flat portion (30) may be further adapted with an open area (33). Such may provide the benefits of making the apparatus lighter and easier to use, but may also improve the stable communication between the flat portion (30) and the mattress (101) since a slight irregularity in the lower surface (102) of the mattress (101) may enhance the stability of the connection.

Figure 5:
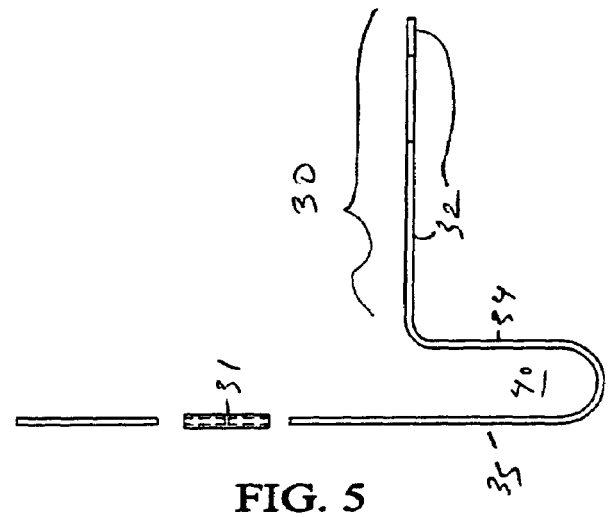
FIG. 5 depicts, from the side, the U-shaped support member and its component parts separated for the purposes of demonstration.

FIG. 5 depicts this structure from the side. It can be seen that the leaf adapter (31) is adapted to fit over the upper end (42) of the outward side (43) of the U-shaped channel (40) and to receive the edge of a lower side (26) of the platform member (20). Similarly, but as an alternative (not depicted), the upper and lower sides of the leaf could be received by receiving slots of the platform and Uchannel. By ensuring that the leaf (31) is of sufficient strength and that the Uchannel slots (34, 35) are each sufficiently deep, the strength of the support to the platform (20) and ramp (10) will be adequate.

Figure 6:
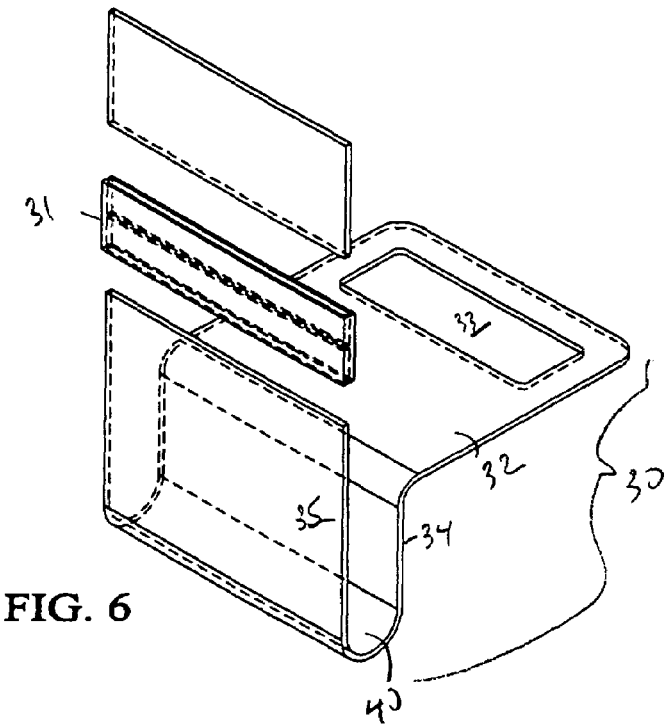
FIG. 6 depicts the U-shaped support member and component parts from an oblique view.

Making reference now to FIG. 6 it can be seen that the leaf (31) comprises upper and lower slot cavities (34, 35) of generally rectangular dimension which are adapted to fit snugly over the upper end (32) of the outward side (33) of the U-shaped channel and to receive the adjusting member (34).

Figure 7:
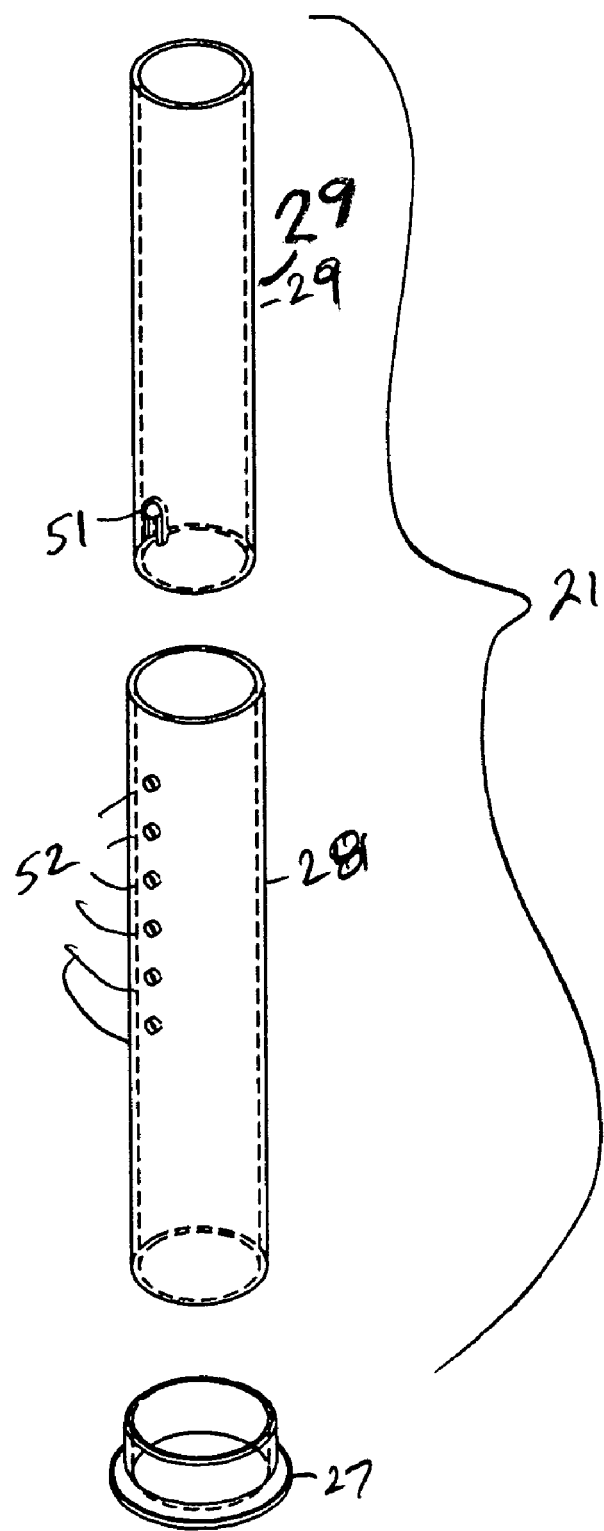
FIG. 7 depicts a leg for the platform support with its various parts separated for demonstration.

FIG. 7 depicts one of the two or more supporting legs (21, 22) to the platform member. It can be seen that these supporting legs (21, 22) each include a base member (27) a primary leg member (28) and an adjustable leg member (29). The primary adjustable leg member (28) is further adapted with a retractable knob member (51) which is adapted to communicate with a series of holes (52) running up-and-down the length of the primary leg member (28). In this manner the length of each overall leg (21, 22) may be controlled. It should also be noted that the platform member (20) (as will be more fully described below) could be adapted with more than two receiving cylindrical channels (61) for receiving upper ends (62) of the the legs (21, 22). In this manner additional platform (20) support could be provided for larger dogs. Of course, two legs are normally sufficient and the addition of additional legs or other support means should be seen as both within the spirit and scope of the present invention as well as covered within the claims of the spirit and scope of the present invention.

Figure 8:
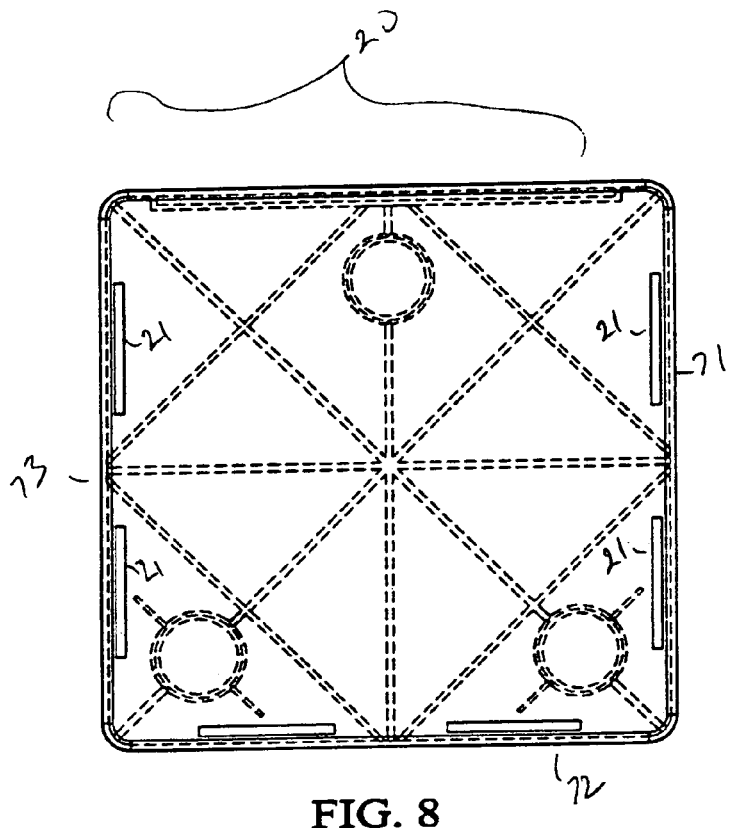
FIG. 8 depicts a view of the platform from above.
Figure 9:
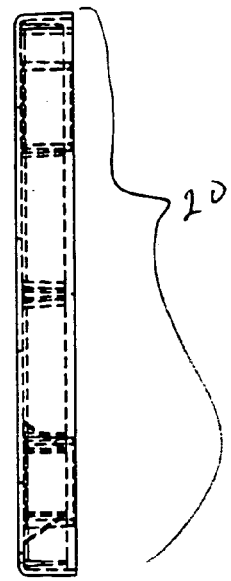
FIG. 9 depicts a view of the platform member from the side.
Figure 10:
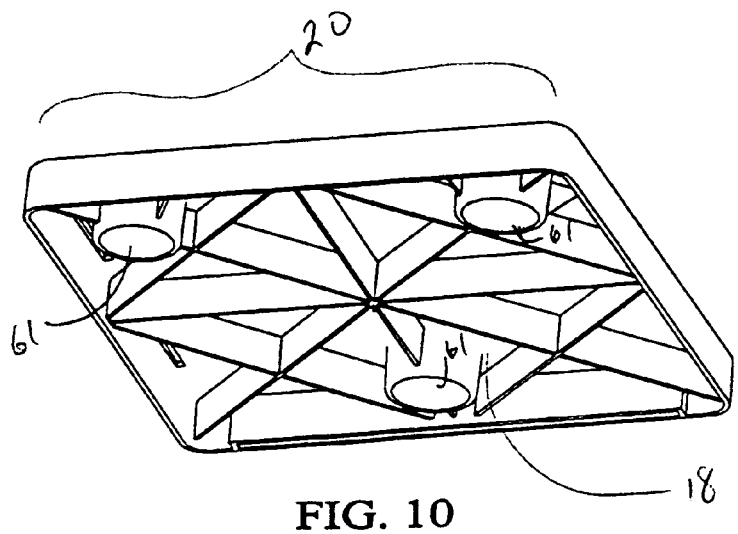
FIG. 10 depicts a lower oblique view of the platform member.

FIGS. 8, 9, and 10 describe the platform member (20). FIG. 8 depicts the platform member (20) from the top. It can be seen that at least three of the sides (71, 72, 73) of the platform member are adapted with one or more notches (21) which are further adapted to receive corresponding protruding members (13) from the ramp member upper end (19). This positions the ramp member (10). FIG. 9 depicts the platform member (20) from the side. FIG. 10 is a view of the bottom (18) of the platform member (10). It can be seen that there are two or more cylindrical channels (61) for receiving the leg members (21, 22) and a slot (29) for receiving the leaf adapter (31) from the support member (30) and Uchannel (40).

This support member (30) is of sufficient length to permit it to be slid under the mattress (101) of the bed (100) and rest upon the box spring (104), or other surface upon which the mattress (101) is placed. The weight of the mattress (101) will keep it in place and also will serve to anchor the ramp (10) in place. The pivoting connection with the ramp enables the ramp to be used with beds of varying heights. In FIG. 4 it is shown that the planar portion may be adapted with an open area (71). Such open area not only reduces the weight of the device, but also helps secure it by increasing the friction between the planar member and the mattress.

FIGS. 1 and 3 depict how the ramp may be further adapted to permit a comforter or bedspread to be left in position upon the bed while still permitting the use of the appliance to benefit the pet. This is done by means of the U-shaped channel (40) which is positioned alongside the bed. One side (42) of this channel (40) rests against the side of the box spring (104) and the other side (43) is set out from the bed by some width (44). The two sides are joined at the bottom by a joining section (45) which may be a simple U-shaped member. This Uchannel (40) will run parallel and proximate to the side of the bed (100) and allow a bedspread (105) or comforter to rest within. If the U is deep enough the bedspread or comforter could hang completely free of any disruption. The slight "gap" between the platform and the bed should be of no consequence to a pet, who should easily be able to negotiate the small distance without problem.

Figure 11:
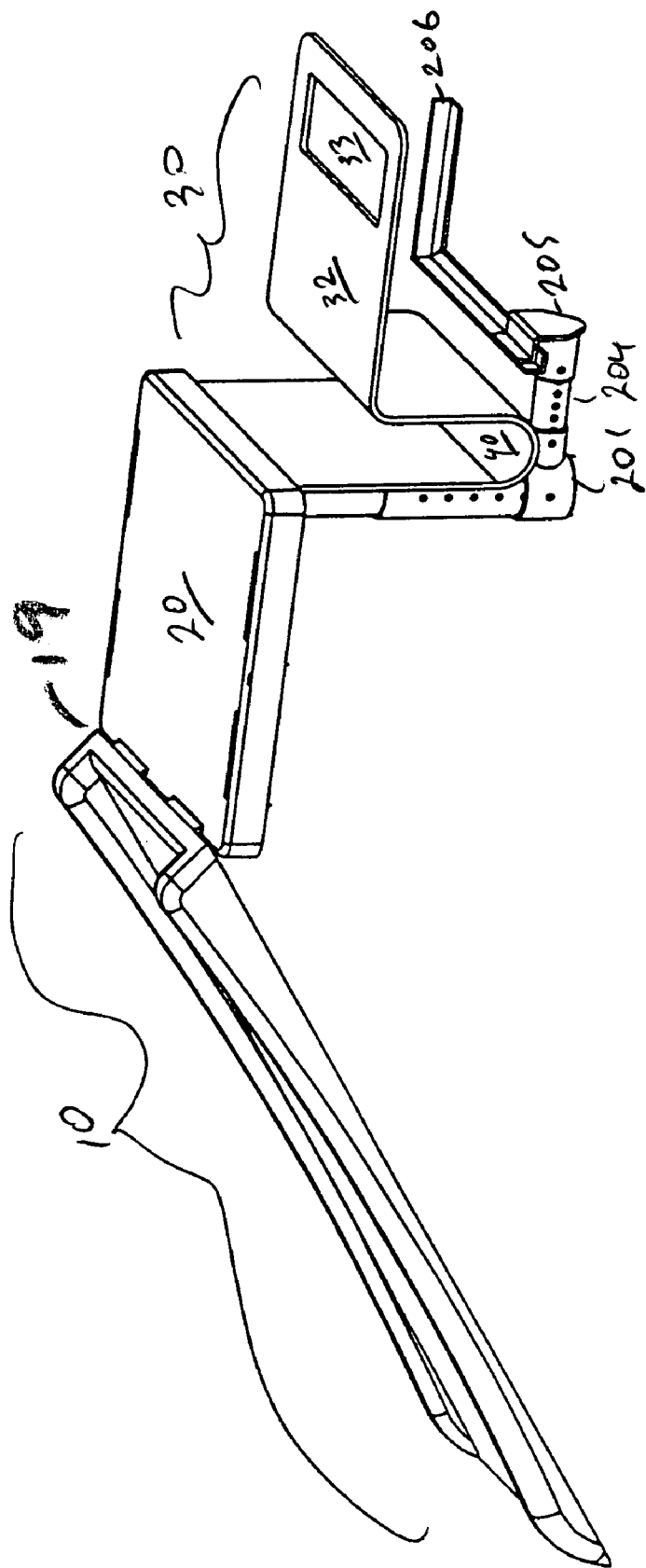
FIG. 11 depicts an alternative means of supporting the pet ramp without legs.

Making reference down to FIG. 11, it can be seen that the platform apparatus could be supported by alternative means, such as an elbow joint (201) connected to a leg (202) of the bed frame (203) by an adjustable or removable upper elbow member (204) and lower elbow members (205) which are further adapted to garner support from the bed frame (203) through a mounting plate (206). The mounting plate (206) could be fastened to a leg of the bed frame or any stable portion of the bed frame support apparatus (not separately depicted).

It should be noted that this embodiment may also comprise the integral support member, U-shaped channel, and platform member embodiments which have been described above and does not require adjustment of the platform supports for the U-shaped channel to account for the height of the bed. It should be noted that the frame of a bed may have stable and secure members other than the legs which may be used to secure the lower member of the elbow joint. All adaptations of this support means with the previously described forms of the invention should be considered as included within this disclosure and in keeping within the spirit and scope of the present invention.

It should be further noted that in any embodiment of this apparatus it may be desirable to have some means of adjusting the slope of the ramp. Such will obviously depend upon the length of the ramp in the height of the platform. For instance, in order to reduce the slope of the ramp one could use a longer ramp or one could lower the platform slightly by using a similar adapter and shortening the legs. This may result in a small step up from the platform to the bed.

It should be further noted that the apparatus may be made of any suitable material, as long as such material comprises the requisite strength and rigidity. This could include plastic, wood or composition material, or even sheet metal. It is a purpose of the invention to achieve an apparatus which is light and easy to move. It should be obvious that larger pets will need stronger support.

It should also be noted that the various component pieces are all either flat or elongate. Accordingly, the apparatus lends itself to not only quick disassemble and reassembly, but may also be stored easily under the bed or in a nearby closet. Even the elbow joint embodiment could be made with snap in elbow joint members so that only the bed frame mount member would require strong attachment and require some time and care to install. Upon disassembly this bved frame mount member could remain installed and out of sight being concealed either by the bedspread or otherwise under the mattress or box spring.

Further modification and variation can be made to the disclosed embodiments without departing from the subject and spirit of the invention as defined in the following claims. All such modifications and variations, as included within the scope of these claims, are meant to be considered part of the invention as described.

What is claimed is:

1. Ramp apparatus for facilitating the movement of a pet up to and down from the surface of a bed, the apparatus comprising:

a ramp member of sufficient length to extend from a point near the surface of a bed down to the floor at an angle suitable for permitting easy movement up or down by a pet;

said ramp member having, at its upper end, hinge apparatus for pivotally joining and securing said ramp member to a platform, said hinge apparatus allowing said ramp member to be supported by said platform;

said platform being further supported at a height near the height of an adjacent bed by an elbow joint apparatus which may be secured to a leg or other stable portion of the frame of an adjacent bed;

said elbow joint apparatus further comprising an upper elbow member, said upper member extending up to support the lower surface of said platform, a joining elbow member, said joining elbow member receiving the lower end of said upper elbow member and turning through an angle of about 90 degrees, and a lower elbow member, said lower elbow member being received by the other end of said elbow joining member at one end and being received by a bed support member on the other end, said bed support member being securely fastened to a stable portion of the bed frame support structure by means of a bed frame mount apparatus; and said platform being further adapted between the mattress and box spring or between the mattress and a flat surface upon which said mattress is positioned with a bed support apparatus, said bed support apparatus further comprising a plate member which is pivotally attached to said ramp, said plate member being of sufficient length to extend from said pivotal joint to said ramp member of a sufficient length beneath said mattress to provide stability and support to said ramp member.

2. The ramp apparatus described in claim 1 in which the surface of said ramp member is further adapted with a material which provides traction and stability to a pet moving up or down said ramp member.

3. The ramp apparatus described in claim 1 in which said ramp member surface is made of plastic which is roughened to provide said traction and stability.

4. The ramp apparatus described in claim 1 for permitting a pet to climb upon a bed, the apparatus further being adapted to remain in place without disturbing the arrangement of a comforter or other bedspread, the apparatus further comprising:

a ramp member of sufficient length to extend from a point near the surface of a bed down to the floor at an angle suitable for permitting easy movement up or down said ramp member by a small pet;

said ramp member having, at its upper end, apparatus for securing said ramp member between the mattress and box spring or between the mattress and a flat surface upon which said mattress is positioned, said apparatus further comprising a plate member which is pivotally joined to said ramp member with a pivotal joint, said plate member being of sufficient length to extend from said pivotal joint to said ramp member a sufficient length beneath said mattress to provide stability and support to said ramp member;

said ramp member further being adapted with a surface which provides traction and stability to a pet moving up or down said ramp member;

said ramp member further comprising, at its upper end, a U-shaped member along the ramp member surface, said U-shaped member having a width which is generally perpendicular to the plane of the ramp member surface and which is disposed generally downward from said ramp member surface and alongside said mattress such that the interior of said U-shaped member defines space of sufficient width to permit a bedspread or comforter to pass within and being of sufficient depth to accommodate an overhang of said bedspread or comforter;

said pivotal support member being further adapted to be fixed upon the outer surface of said U-shaped member.

5. The ramp apparatus described in claim 1 in which said lower elbow member is adapted to snap into and out of a receiving snap member on said bed frame mounting apparatus.

6. The ramp apparatus described in claim 5 in which the surface of said ramp member is further adapted with a material which provides traction and stability to a pet moving up or down said ramp member.

7. The ramp apparatus described in claim 5 in which said ramp member surface is made of plastic which is roughened to provide said traction and stability.

8. The ramp apparatus described in claim 5 for permitting a pet to climb upon a bed, the apparatus further being adapted to remain in place without disturbing the arrangement of a comforter or other bedspread, the apparatus further comprising:

a ramp member of sufficient length to extend from a point near the surface of a bed down to the floor at an angle suitable which permits easy movement up or down said ramp member by a small pet;

said ramp member having, and its upper end, apparatus for securing said ramp member between the mattress and box spring or between the mattress and a flat surface upon which said mattress is positioned, said apparatus further comprising a plate member which is pivotally joined to said ramp member with a pivotal joint, said plate member being of sufficient length to extend from said pivotal joint to said ramp member a sufficient length beneath said mattress to provide stability and support to said ramp member;

said ramp member further being adapted with a surface which provides traction and stability to a pet moving up or down said ramp member; and said ramp member further comprising, at its upper end, a U-shaped member along the ramp member surface, said U-shaped member having a width which is generally perpendicular to the plane of the ramp member surface and which is disposed generally downward from said ramp member surface and alongside said mattress such that the interior of said U-shaped member defines space of sufficient width to permit a bedspread or comforter to pass within and being of sufficient depth to accommodate an overhang of said bedspread or comforter.

9. Ramp apparatus for permitting a pet to climb upon or down from the surface of a bed, said ramp apparatus further being adapted to remain in place without disturbing the arrangement of a comforter or other bedspread, the apparatus further comprising:

a ramp member of sufficient length to extend from a point near the surface of a bed down to the floor at an angle which permits easy movement up or down said ramp member by a small pet;

said ramp member having, and its upper end, apparatus for securing said ramp member between the mattress and box spring or between the mattress and a flat surface upon which said mattress is positioned, said apparatus further comprising a plate member which is pivotally joined to said ramp member with a pivotal joint, said plate member being of sufficient length to extend from said pivotal joint to said ramp member a sufficient length beneath said mattress to provide stability and support to said ramp member;

said ramp member further being adapted with a surface for providing traction and stability of a pet moving up or down said ramp member; and said ramp member further comprising, at its upper end, a U-shaped member along the ramp member surface, said U-shaped member running perpendicular to the plane of the ramp member surface and generally downward from said ramp member surface and defining a space of sufficient width to permit a bedspread or comforter to pass within and said you member being of sufficient depth to accommodate the overhang of said bedspread or comforter.

10. The ramp apparatus described in claim 9 in which said surface of said ramp member further comprises a surface material which provides traction and stability to a pet moving up or down said ramp member.

11. The ramp apparatus described in claim 9 in which said surface of said ramp member further comprises plastic which is roughened to provides said traction and stability.

12. Ramp apparatus for permitting a pet to climb upon a bed, the apparatus being adapted to remain in place without disturbing the arrangement of a comforter or other bedspread, the apparatus further comprising:

a ramp member of sufficient length to extend from a point near the surface of a bed down to the floor at an angle which permits easy movement up or down said ramp member by a small pet;

said ramp member having, at its upper end, hinge apparatus for pivotally joining and securing said ramp member to a platform, said hinge apparatus allowing said ramp member to be supported by said platform, said platform being further supported at a height near the height of an adjacent bed by three or more adjustable legs;

said platform being further adapted for support from between the mattress and box spring or between the mattress and a flat surface upon which said mattress is positioned by means of a bed support apparatus, said bed support apparatus further comprising a plate member which is attached to said platform, said plate member being of sufficient length to extend from said pivotal joint to said ramp member of a sufficient length beneath said mattress to provide stability and support to said ramp member;

said ramp member having, and its upper end, apparatus for securing said ramp member between the mattress and box spring or between the mattress and a flat surface upon which said mattress is positioned, said apparatus further comprising a plate member which is pivotally joined to said ramp member with a pivotal joint, said plate member being of sufficient length to extend from said pivotal joint to said ramp member a sufficient length beneath said mattress to provide stability and support to said ramp member;

said ramp member further being adapted with a surface which provides traction and stability of a pet moving up or down said ramp member; and said ramp member further comprising, at its upper end, a U-shaped member along the ramp member surface, said U-shaped member running perpendicular to the plane of the ramp member surface and, generally downward from said ramp member surface and defining a space of sufficient width to permit a bedspread or comforter to pass within and said U-shaped member being of sufficient depth to accommodate the overhang of said bedspread or comforter.

13. The ramp apparatus described in claim 12 in which said surface of said ramp member further comprises a surface material which provides traction and stability to a pet moving up or down said ramp member.

14. The ramp apparatus described in claim 13 in which said surface of said ramp member further comprises plastic which is roughened to provide said traction and stability.

* * * * *